Patented Jan. 2, 1940

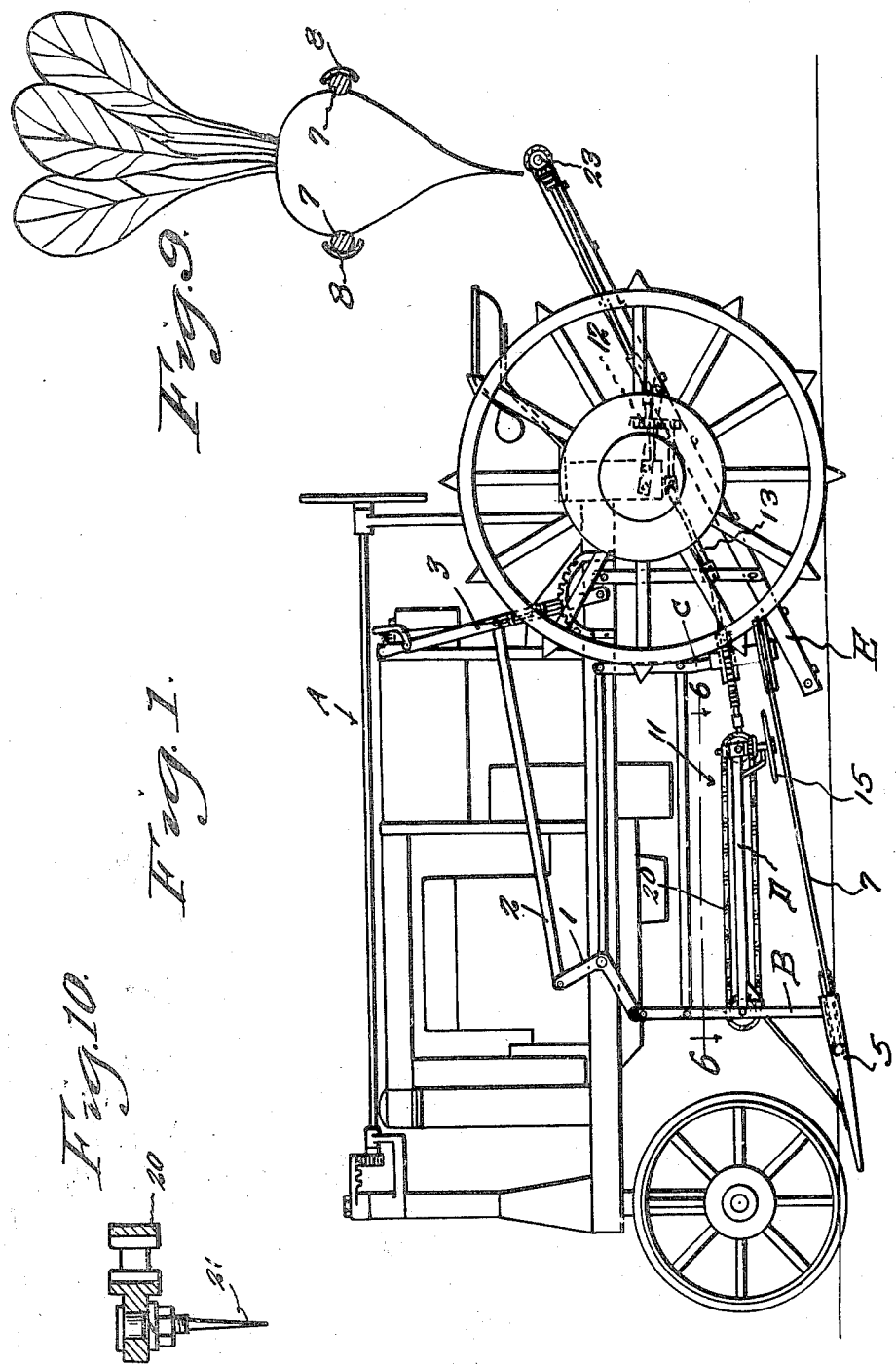

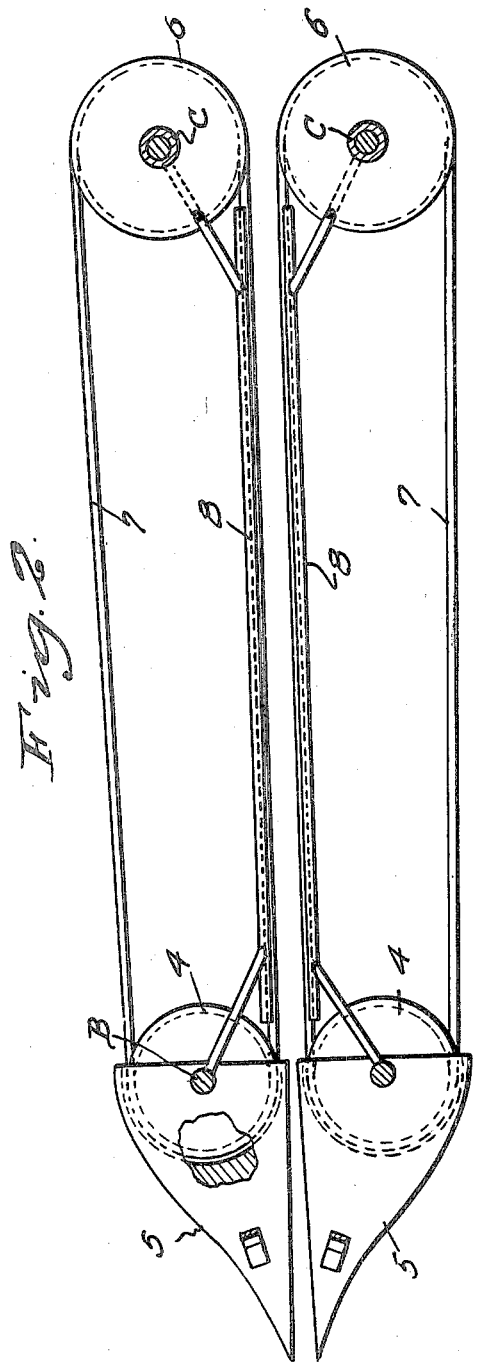
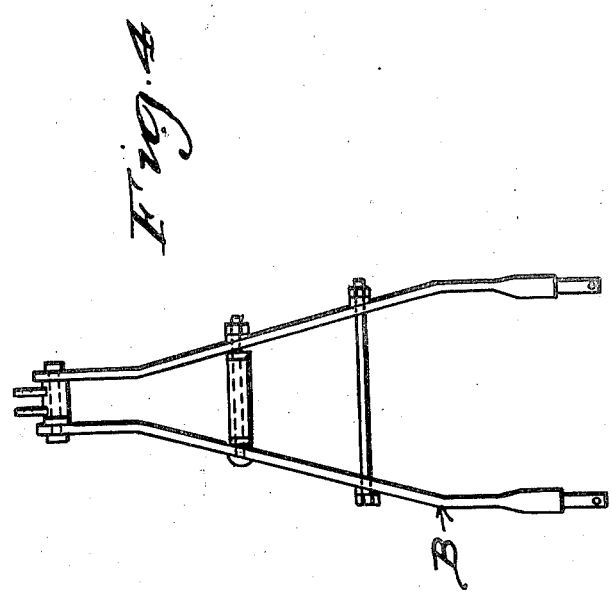
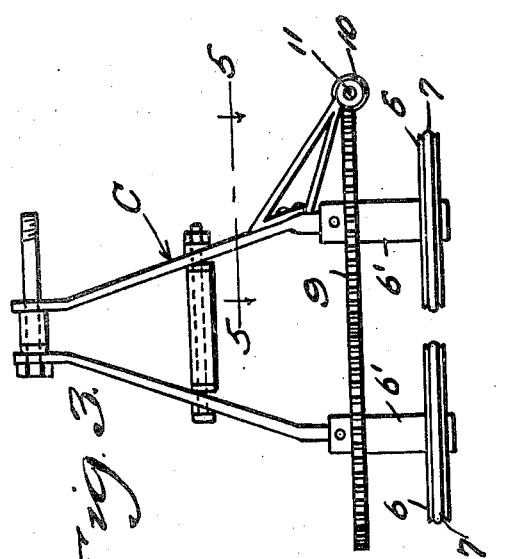

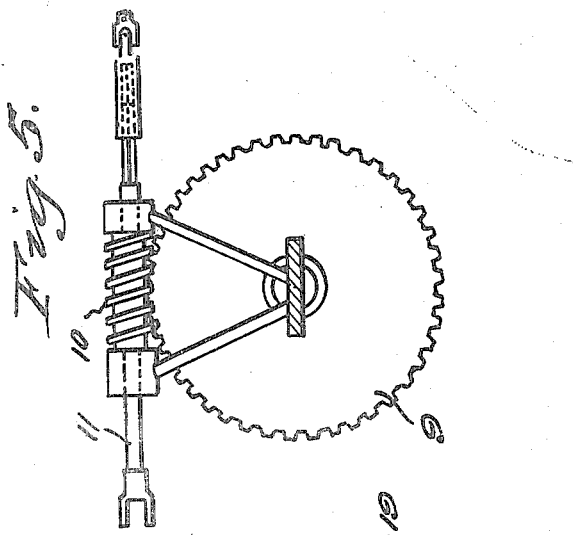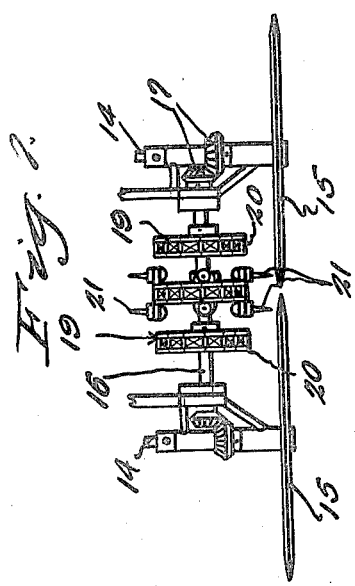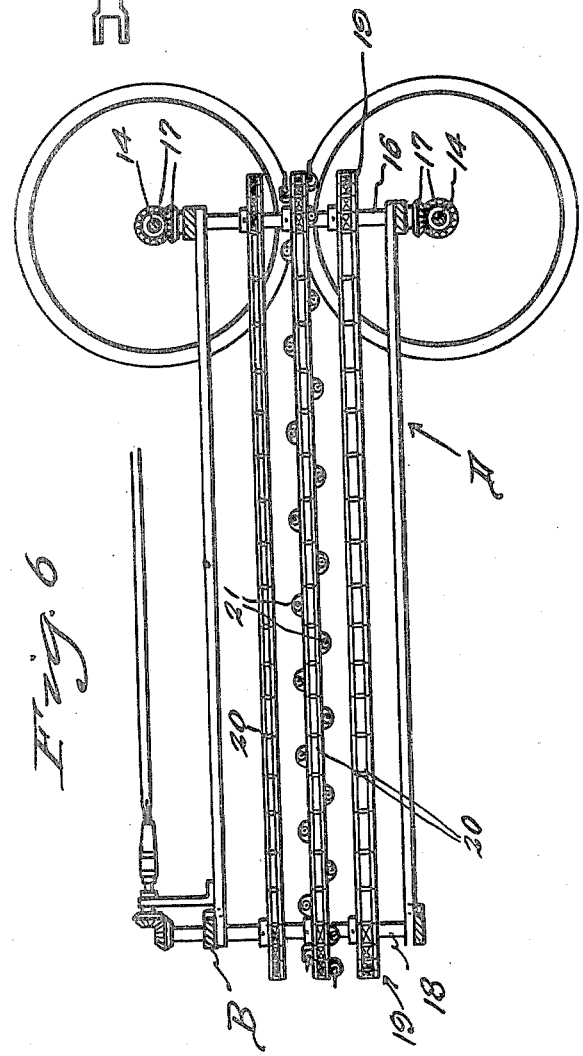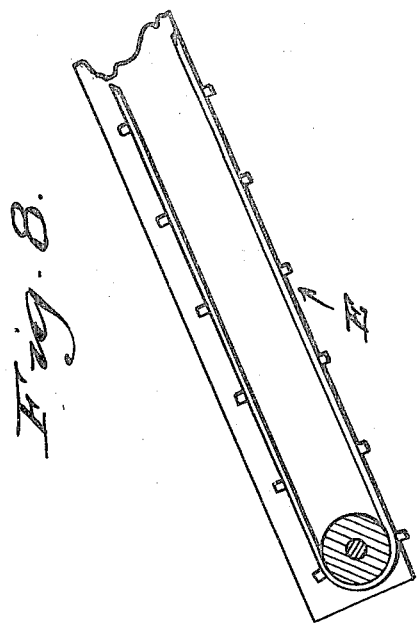

2,185,350

UNITED STATES PATENT OFFICE 2,185,350

BEET HARVESTING MACHINE

Guy Michael, Napoleon, Ohio

Application February 14, 1939, Serial No. 256,346

3 Claims. (Cl. 55—108)

This invention relates to a beet lifter and topper, the general object of the invention being to provide means, carried by a tractor, for lifting the beets from the ground and conveying them to a set of knives, which cut the tops off the beets while they are being moved by the conveyor, the beets adjusting the knives so that the tops will be cut at the desired point, regardless of the size of the beets.

The invention also consists in certain other features of construction, combination and arrangement of the several parts, to be hereinafter fully described, illustrated in the accompanying drawings and specifically pointed out in the appended claims.

In describing the invention in detail reference will be had to the accompanying drawings wherein like characters denote like or corresponding parts throughout the several vews, and in which:

Figure 1 is an elevational view of a tractor showing the invention applied thereto.

Figure 2 is a horizontal sectional view showing the conveyor and lifting means.

Figure 3 is a view of the rear frame and showing the means for driving the conveyor.

Figure 4 is a view of the front frame.

Figure 5 is a section on line 5—5 of Figure 3.

Figure 6 is a section on line 6—6 of Figure 1 but simply showing the gage means and the knives.

Figure 7 is a rear view of the gage means and the knives.

Figure 8 is a vertical sectional view through parts of the elevator conveyor.

Figure 9 is a sectional view through the front conveyor and showing how a beet is engaged thereby.

Figure 10 is a detailed sectional view showing how the beet engaging projections are connected with a chain of the gage.

In these drawings, the letter A indicates a tractor on which the invention is placed. The letter B indicates a frame of substantially inverted U-shape suspended from the tractor by means of a bell crank 1 which is connected by a link 2 to a hand lever 3, pivoted to a part of the tractor, adjacent the driver's seat. The lower ends of the limbs of the frame B carry the pulleys 4 and these limbs also carry the lifter points 5, between which the beets pass as the tractor moves along the row. A substantially similar shaped frame C depends from the tractor and the lower ends of the limbs of this frame C carry the pulleys 6 and a belt 7 passes around each pair of front and rear pulleys 4 and 6, the inner reaches of the belts being spaced apart to receive and engage the beets and in order to prevent the beets from pressing the belts apart, guides 8 are carried by the frames B and C, as shown in Figures 2 and 9. These guides are of semi-circular shape in cross section, as shown in Figure 9. The hubs 6' of the rear pulleys have attached thereto the intermeshing gears 9 and a worm 10 engages one of these gears. This worm is carried by a shaft 11 supported by frame C and is driven from a take-off shaft of the tractor through means of the gears 12 and the shafting 13, the shafting including universal joints and slip joints, as shown in Figure 1.

A gage frame D has its front end pivotally attached to an intermediate part of the front frame B and frame D extends rearwardly and at its rear end supports the shafts 14 which have attached to their lower ends the disk knives 15. The shafts 14 are driven from a cross shaft 16 in the rear end of frame D through means of the gears 17 and said shaft 16 is suitably driven from shaft 11. A cross shaft 18 is supported in an intermediate part of frame B and frame D is pivoted to this shaft 18 and each of the shafts 16 and 18 carries three sprockets 19 for the three chains 20. The center chain carries the hooks or projections 21 which are arranged in two rows one at each side of the chain and the projections are staggered, as shown in Figure 6.

An upwardly and rearwardly elevating conveyor E is supported by the tractor, for receiving the topped beets from the front conveyor and dropping them into a receiving device at the rear of the tractor, this rear conveyor also being actuated from the take-off shaft of the tractor, as shown generally at 23.

Thus as the tractor travels along a row of beets the lifters 5 will lift the beets from the ground and then the beets will be engaged by the pair of beets 7 which carry the beets upwardly and rearwardly. As the tops of the beets engage the chains of the gage frame D, they will lift the frame so that when they arrive at the knives 15, the knives will cut the tops off the beets just at the proper place, as the knives are adjusted by the beets themselves. The hooks or projections will help to push the beets against the knives. Then the topped beets will be carried upwardly and beyond the rear end of the tractor by the conveyor E. The hand lever 3 is used to adjust the front end of the device relatively to the ground or to lift the device entirely above the ground, when it is not desired to use the device.

It is thought from the foregoing description that the advantages and novel features of the invention will be readily apparent.

It is to be understood that changes may be made in the construction, combination and arrangement of the several parts, provided such changes fall within the scope of the appended claims.

What I claim and desire to protect by Letters Patent is:

1. A beet lifting and topping device comprising a supporting frame a vertically arranged frame depending therefrom, a second vertically arranged frame depending from the supporting frame, a pair of pulleys at the end of each vertical frame, belts passing over the pulleys, lifter members carried by the lower end of the front depending frame, a substantially arranged horizontal frame having its front end pivoted to the first depending frame, rotary knives carried by the rear end of the horzontal frame and acting to cut the tops of beets moved by the belts, a projection carrying chain carried by the horizontal frame and means for actuating the chain, the knives and the belts.

2. An attachment for a tractor comprising a front depending frame, a rear depending frame of less length than the front frame, pulleys carried by the lower ends of the frames and horizontally arranged, belts passing over the pairs of front and rear pulleys, lifter members extending forwardly from the lower ends of the front frame, a horizontal frame having its front end pivoted to an intermediate part of the front frame, front and rear shafts carried by the horizontal frame, sprockets carried by said shafts, chains passing over the sprockets, projections carried by one chain, depending shafts carried by the rear end of the horizontal frame and driven by the rear horizontal shaft, knives carried by the lower ends of said depending shafts and means for driving the shafts and the belts from the tractor.

3. An attachment for a tractor comprising a front depending frame, a rear depending frame of less length than the front frame, pulleys carried by the lower ends of the frames and horizontally arranged, belts passing over the pairs of front and rear pulleys, lifter members extending forwardly from the lower ends of the front frame, a horizontal frame having its front end pivoted to an intermediate part of the front frame, front end rear shafts carried by the horizontal frame, sprockets carried by said shafts, chains passing over the sprockets, projections carried by one chain, depending shafts carried by the rear end of the horizontal frame and driven by the rear horizontal shaft, knives carried by the lower ends of said depending shafts and means for driving the shafts and the belts from the tractor and a conveyor extending upwardly and rearwardly at the rear of the tractor and receiving the beets from the belts.

GUY MICHAEL.